United States Patent [19]
Liu et al.

[11] Patent Number: 5,720,780
[45] Date of Patent: Feb. 24, 1998

[54] FILM FORMING METHOD FOR LITHIUM ION RECHARGEABLE BATTERIES

[75] Inventors: Peikang Liu; Feng Gao, both of Henderson, Nev.

[73] Assignee: Valence Technology, Inc., Henderson, Nev.

[21] Appl. No.: 743,286

[22] Filed: Nov. 4, 1996

[51] Int. Cl.$^6$ .................................................. H01M 6/00
[52] U.S. Cl. ............................................................ 29/623.1
[58] Field of Search .......................... 429/192; 29/623.1, 29/623.2, 623.4, 623.5; 264/165; 419/61, 66, 1, 65

[56] References Cited

U.S. PATENT DOCUMENTS

| | | | |
|---|---|---|---|
| 5,296,318 | 3/1994 | Gozdz et al. | 429/192 |
| 5,418,091 | 5/1995 | Gozdz et al. | 429/252 |
| 5,429,891 | 7/1995 | Gozdz et al. | 429/247 X |
| 5,456,000 | 10/1995 | Gozdz et al. | 29/623.2 |

*Primary Examiner*—Anthony Skapars
*Attorney, Agent, or Firm*—Karen S. Perkins

[57] ABSTRACT

A novel processing method provides a separator or electrode film demonstrating good physical properties and excellent conductive properties. Specifically, a binder of a suitable polymer, such as a polyvinylidene difluoride (PVdF) homopolymer, and a filler material such as silica or alumina are homogenized, such as by ball milling, to form a mixture free of solvents or plasticizers. An appropriate plasticizer, such as dimethyl adipate, is mixed into the binder and filler materials, and the resulting material is formed into a sheet. The sheet is hot pressed or melt processed at a temperature greater than the softening point but less than the melting point of the polymer mix. Electrode films can also be made using the method herein.

16 Claims, 1 Drawing Sheet

FILM FORMING METHOD FOR LITHIUM ION RECHARGEABLE BATTERIES

TECHNICAL FIELD

This invention relates generally to electrolytic cells comprising a polymeric electrolyte film separator positioned between an anode and a cathode, and to a method of economically making such cells. More particularly, this invention relates to polymeric film electrodes and electrolyte separator elements formed without solvent casting.

BACKGROUND OF THE INVENTION

Separators are used in electrolytic cells, such as batteries in which lithium ions from a source electrode material move between cell electrodes during the charge and discharge cycles of the cell. During discharge, lithium ions from the anode pass through a liquid electrolyte to the electrochemically active material of the cathode, where the ions are taken up with the simultaneous release of electrical energy. During charging, the flow of ions is reversed so that lithium ions pass from the electrochemically active cathode material through the electrolyte and are plated back onto or intercalated into the anode.

An electrolytic cell, such as a rechargeable battery cell, is commonly constructed by means of the lumination of electrode and electrolyte film cell elements which are individually prepared. Each of the electrodes and the electrolyte film/separator is formed individually, for example by coating, extrusion, or otherwise, from compositions including the binder materials and a plasticizer.

In the construction of a lithium-ion battery, for example, an anodic current collector may be positioned adjacent an anode (negative electrode) film, or sandwiched between two separate anode films, to form the negative electrode.

Similarly, a cathodic current collector may be positioned adjacent a cathode (positive electrode) film, or sandwiched between two separate cathode films, to form the positive electrode.

A separator is positioned between the negative electrode and the positive electrode. The anode, separator, and cathode structures are then laminated to produce a unitary flexible battery precursor structure.

An extraction process is used to prepare the battery precursor for activation with electrolyte. During processing of the battery precursor, a large quantity of a homogeneously distributed plasticizer is present in the solid polymeric matrix. Prior to activation of the battery, however, the organic solvent is removed. This is generally accomplished using an extracting solvent such as diethyl ether or hexane, which selectively extracts the plasticizer without significantly affecting the polymer matrix. This produces a "dry" battery precursor, which does not include any electrolyte solvent or salt. An electrolyte solvent and electrolyte salt solution is imbibed into the "dry" battery copolymer membrane structure to yield a functional battery system.

A solid, secondary battery typically comprises several solid, secondary electrolytic cells in which the current from each of the cells is accumulated by a conventional current collector, so that the total current generated by the battery is roughly the sum of the current generated from each of the individual electrolytic cells employed in the battery.

The separator physically contains a measure of fluid electrolyte, usually in the form of a solution of a lithium salt and an appropriate solvent, upon activation of the battery. The separator also provides a means for preventing destructive contact between the electrodes of the cell. Separators have been made of glass fiber filter paper or cloth, microporous polyolefin film, or nonwoven fabric. Preferably, the electrolyte film/separator of the prior art has been formed as a sheet of a copolymeric matrix solution and a plasticizer solvent which has been solvent cast. The casting solvent (typically acetone or tetrahydrofuran (THF)) is evaporated to produce the separator.

U.S. Pat. No. 5,418,091, to Gozdz, which is incorporated by reference in its entirety, discloses the formation of electrode and electrolyte film/separator elements. The electrodes and electrolyte film/separator elements are formed of a polyvinylidene difluoride (PVdF) and hexafluoropropylene (HFP) copolymer. The copolymer comprises about 75 to 92 wt % PVdF and about 8 to 25 wt % HFP. These copolymeric binder materials with electrolyte solutions (e.g., LiPF$_6$ in 2:1 EC/DMC) provided effective ionic conductivity of between about $1\times10^{-5}$ and $1\times10^{-3}$ S/cm.

A variety of materials were attempted and found to be unworkable in the Gozdz reference. For example, PVdF homopolymers were found to demonstrate "undesirably high crystallinity" and undesirably low conductivity. Only with the addition of HFP to form a copolymer was a successful product obtained.

The anode, cathode, or separator film is preferably cast using a casting solvent such as acetone or THF and PVdF/HFP copolymer as binder. However, the use of such casting solvents is environmentally undesirable, especially for large-scale production.

In view of the above shortcomings associated with the prior art, there is a need for solid state electrochemical devices that are capable of providing improved manufacturing parameters, and improved battery performance.

SUMMARY OF THE INVENTION

A novel processing method provides a separator or electrode film demonstrating good physical properties and excellent conductive properties. Specifically, a binder of a suitable polymer, such as a polyvinylidene difluoride (PVdF) homopolymer, and a filler material such as silica or alumina are homogenized, such as by ball milling, to form a uniform mixture free of solvents or plasticizers. If the material is to provide an electrode structure, anode active or cathode active materials such as graphite can be substituted for filler materials.

An appropriate plasticizer, such as dimethyl adipate, is mixed into the binder and filler materials, and the resulting material is hot pressed or melt processed at a temperature less than the melting point of the polymer into a free-standing film or sheet.

BRIEF DESCRIPTION OF THE DRAWINGS

The FIGURE is drawn for clarity and is not drawn to scale. Similar numbers refer to similar structures.

DETAILED DESCRIPTION OF THE INVENTION

Figure 1:
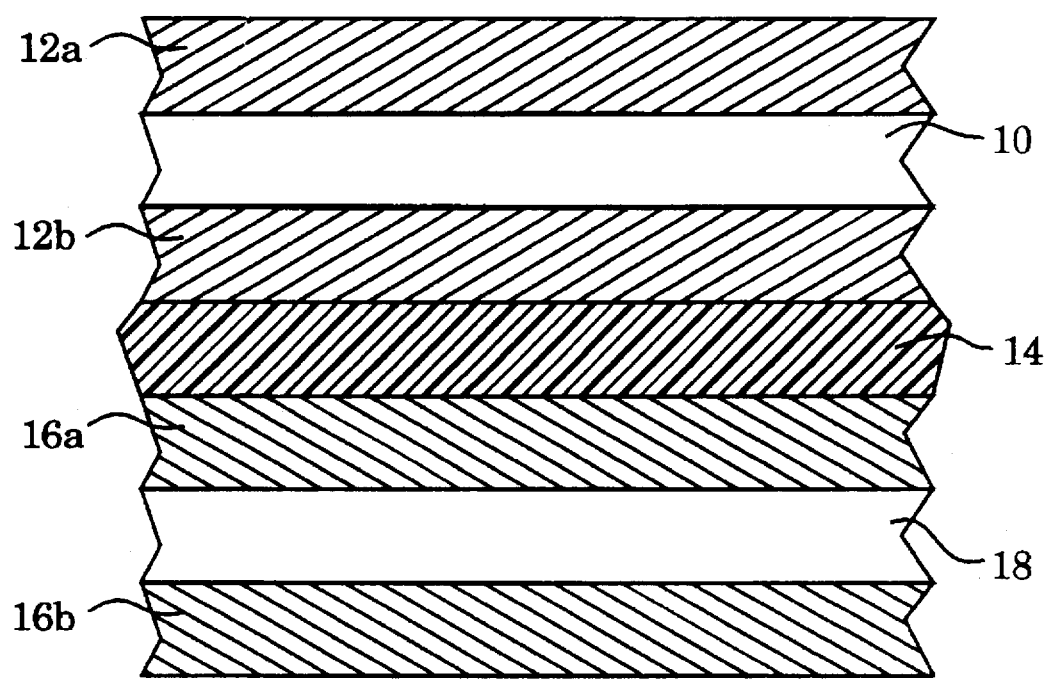
FIG. 1 shows a cross-sectional view of a battery, including anode, cathode, and separator.

An electrochemical cell or battery of the subject invention has a negative electrode side, a positive electrode side, and a separator (preferably a polymeric electrolyte film) therebetween. An ion-conducting electrolyte provides ion transfer from one electrode to the other. Generally in electrolytic cells of the subject invention, the ion-conducting electrolyte is permeated throughout the structures of each of the anode, the cathode, and the interposed separator or polymeric electrolyte film.

FIG. 1 shows a typical laminated electrolyte cell of the subject invention. An anodic current collector 10 can have anode film 12a, 12b adjacent both surfaces (as shown), or adjacent only one surface (not shown). The anode (negative electrode) film 12a, 12b is formed by providing anodic material dispersed in a polymer matrix. The anode can be provided as a preformed anode film 12a/current collector 10/anode film 12b structure, or it can be provided as three separate strata which are laminated in situ.

The separator 14 is placed adjacent an anode film 12b. The separator physically contains a measure of fluid electrolyte, usually in the form of a solution of a lithium salt and an appropriate solvent, upon activation of the battery. The separator also provides a means for preventing destructive contact between the electrodes of the cell. The improved separator produced by the method of the subject invention includes a homopolymeric binder.

A cathode (positive electrode) film 16a, 16b is formed by providing a cathodic material dispersed in a copolymer matrix. A cathode film 16a is positioned adjacent the electrolyte film/separator layer 14, and a cathodic current collector 18 is laid upon the cathode film 16a. A second cathode film 16b can be provided adjacent the cathodic current collector 18. Alternatively, the cathode can be provided as a pre-formed cathode film 16a/current collector 18/cathode film 16b structure.

An anodic electrode, separator, and cathodic electrode are appropriately positioned, and the assembly is generally pressurized or heated under pressure to provide bonding between the various strata. The plasticizer is extracted to form a unitary battery precursor structure. The cell precursor is activated when an inorganic salt and an electrolyte solvent are placed within the porous portions of the cell precursor. Once the electrochemical cell has been activated, it is charged using an external energy source prior to use.

A battery of the subject invention refers to one or more electrochemical cells electrically interconnected in an appropriate series or parallel arrangement, to provide required operating voltage and current levels.

The separator is a solid polymeric matrix in the form of a polymeric electrolyte film. The method herein provides a polymeric electrolyte film having a porous structure, permeated with a plasticizer, upon heat processing.

The method herein may be used for preparing a polymeric film electrolyte cell element. One preferred embodiment uses materials appropriate to form a separator film. In alternate embodiments, cathode active materials or anode active materials are selectively substituted for the silica in the separator base materials, to form a cathode or anode film, respectively.

A binder material is provided. Preferably, the binder material is a homopolymer of PVdF. An especially preferred polymeric matrix of PVdF provides a flexible, self-supporting film. However, some additional polymeric material, such as HFP, can be present in minimal amounts (less than 5%).

The PVdF is preferably provided, prior to homogenization, in the form of a fine powder. For example, KYNAR™ (Elf Atochem, Philadelphia, Pa.) is a PVdF available in varying grades of fine powder. Comparisons of various formulations of commercially available PVdF are given in Tables 1 and 2.

An inorganic filler adjunct, such as fumed alumina or fumed silica, is added to provide structural stability to the binder and provide a film having desirable qualities. The filler is also preferably provided as a fine powder, to minimize the homogenization time. The filler is a hydrophobic material, such as CAB-O-SIL™ TS-530 or TS-610 (Cabot Corp., Tuscola, Ill.).

The homogenization can be carried out by any appropriate means. Generally, the homogenization will involve elimination of aggregations within the materials, for example by grinding, cutting, shredding, chopping, etc., to separate aggregates into individual particles and provide a uniform mixture. One preferred homogenization method is the use of a ball-mill mixer, although other fine-grinding devices may be equally appropriate. The homogenization also provides a thorough mixing of the binder and the filler. For purposes of illustration, and not by way of limitation, homogenization will be described with reference to a ball mill mixer apparatus. It will be apparent to those skilled in the art that other appropriate apparatus can be substituted if desired.

The homogenization will generally conveniently take place at or around room temperatures, although higher or lower temperatures may also be appropriate. The mixing of anode and cathode formulations conveniently take place at an elevated temperature, such as from about 120°–130° C. The homogenization should be carried out at a temperature less than the melting point of any of the materials.

Homogenization time will vary somewhat with the size and character of the starting characteristics of the binder and the filler. Ball mixing for as little as three hours can yield adequate results. However, ball mixing a formulation for eight hours, and more preferably twenty-four hours or more, improves the separator film characteristics. This is demonstrated in Tables 3 and 4, below. Generally, the longer the formulation is homogenized, the less plasticizer it will be necessary to add, while still providing a material which can be processed into a film. Reduced plasticizer use results in improved film shrinkage characteristics, as shown in Table 5.

In a preferred embodiment, the binder and filler material are each provided in a fine powder form. Generally, the average diameter of the binder and filler particulates should be less than about 10 μm preferably less than about 5 μm.

After homogenization, the filler/binder mixture will be a substantially uniform powder. The ratio of filler to binder (by weight) is generally from about 1:1 to about 1:2. The optimized ratio will vary with the specific materials used and the degree of homogenization.

After homogenization of the filler/binder, a plasticizer is added. Generally, plasticizers are organic solvents, with limited polymer solubility, that facilitate the formation of porous polymeric structures. Appropriate plasticizers have high boiling points, typically in the range from about 150° to about 350° C. The plasticizer or plasticizer system must be compatible with the components of the electrochemical cell precursor, it must be processable within design parameters, and it must exhibit low polymer solubility.

A variety of plasticizers for processing or activation of the battery precursor are known to the art. Such materials include, for example, ethylene carbonate (EC); propylene carbonate (PC); butylene carbonate (BC); vinlyene carbonate (VC); diethyl carbonate (DEC); dipropylene carbonate (DPC); dibutyl carbonate (DBC); acetates; diesters, such as oxalate, succinate, adipate, suberate and sebacate, with different substituents (dimethyl, diethyl, dipropyl, etc.); glymes; and low molecular weight polymers such as polycarbonates, polyacrylates, polyesters or polysiloxanes. Mixtures of such plasticizers can also be used.

The plasticizer which has shown exceptional and unexpected results in the method herein is dimethyl adipate (DMA).

The amount of plasticizer used will vary with the filler and binder used, and with the amount of homogenization of the filler/binder mix. The amount of plasticizer will be approximately equal to the amount of filler/binder mixture. However, the less the amount of plasticizer used, the less shrinkage will be exhibited by the finished film.

It has been found that 2 parts filler, 3 parts binder, and 7.5 parts plasticizer (1 part filler/binder to 1.5 parts plasticizer), with a three hour ball milling, produces a film with about 15% shrinkage in area upon extraction of the film. This shrinkage makes the film acceptable, but not good. However, the relatively large amount of plasticizer is necessary to form a workable plasticized mixture.

In contrast, 2 parts filler, 3 parts binder, and 5 parts plasticizer (1 part filler/binder to 1 part plasticizer), with a twenty-four hour ball milling, produces a film with about 10% shrinkage in area upon extraction of the film. The shrinkage of the film is good. The reduction in the amount of plasticizer can be accomplished due to the extended homogenization time: the filler/binder mix remains workable even with reduced plasticizer.

Generally, the amount of plasticizer will be from about 30% to about 60% by weight of the total plasticized mixture. Preferably, the amount of plasticizer is 55% or less of the total plasticized mixture. More preferably, the amount of plasticizer is 50% or less.

The plasticized material is formed into a sheet and heat processed to form a film. The plasticized material can be formed into a sheet by doctor blade or extrusion, for example, on an appropriate substrate such as a Mylar® sheet, supporting web, or solid surface.

The solid matrix film is formed by heating the plasticized material sheet to a point above the softening point, but below the melting point of the polymer. For example, PVdF polymer has a melting point of approximately 160° C. The sheet can be heated to a temperature of 120° to 140° C., more preferably 130°–135° C., for a time sufficient to form a film. The time necessary will vary with the specific material, the conditions, and the thickness of the film. For most separator and electrode films, heating to a temperature of from 120° C. to 140° C. for two minutes or less, more generally thirty seconds or less, will be sufficient. For example, plasticized silica/PVdF material 2 mil thick can be heated to a temperature of 135° C. for 30 seconds to form a separator sheet. The elasticized material can be hot pressed, for example between two heated plates or rollers. After heating the polymeric film is removed from the surface upon which it was formed in order to facilitate lamination of the battery structure.

The method described above in relation to a separator film can be modified to provide films for anodic electrodes.

The negative electrode is the anode during discharge. Typical anode active materials are well known in the art, and include, by way of example, lithium; lithium alloys such as alloys of lithium with aluminum, mercury, manganese, iron, or zinc; intercalation based anodes such as those using carbon or tungsten oxides; and the like. Preferred anodes include lithium intercalation anodes employing carbon materials such as graphite, cokes, mesocarbons, and the like. The anode may also include an electron conducting material such as carbon black.

Carbon intercalation based anodes, such as those suitable for use in the subject invention, include a polymeric binder. That is, a solid polymeric matrix provides part of the structure of the anode. As with the separator, the active material/binder is formed using a polymeric binder and an active material, which are homogenized.

An anodic electrode of the subject invention comprises an anode film laminated onto one or both sides of an anodic current collector. Typically, the anode film is from about 100 µm to about 250 µm thick. Preferably, each anode film is about 100 µm to about 200 µm, and more preferably about 125 µm to 175 µm, in thickness.

The anode commonly includes a current collector laminated with the negative electrode material. The anode sheet can be formed on one or both sides of the current collector and heat-processed in place to provide an integral anode structure. An adhesion promoter can be used to facilitate bonding between the anode film and the anodic current collector.

Materials suitable for anodic current collectors are known to the art, and are usually comprised of an electron conductive material such as metals or alloys. Typical materials include nickel, iron, stainless steel, or copper. Preferably a copper foil sheet, open mesh, expanded metal, woven or non-woven or knitted wire fabric or grid is used. Preferably, the current collector has a thickness from about 20 µm to about 100 µm, more preferably about 40 µm to about 50 µm. Each current collector is also connected to a current collector tab which extends from the edge of the current collector. In batteries comprising multiple electrochemical cells, the anode tabs are preferably welded together and connected to a nickel lead. External loads can be electrically connected to the leads. Current collectors and tabs are described in U.S. Pat. Nos. 4,925,752; 5,011,501; and 5,326,653, each of which is incorporated herein.

An adhesion promoter can be used to facilitate bonding between the anode film and the anodic current collector.

The method described above in relation to an anode electrode film can also be modified to provide films for cathodic electrodes.

The positive electrode is the cathode during discharge. Typical cathode active materials are known to the art, and include insertion compounds, i.e., any material which functions as a positive pole in a solid electrolytic cell. Preferable cathodic materials de-intercalate lithium at a high voltage when contrasted to lithium, making them stable in air. Cathodic materials include, by way of example, transition metal oxides, sulfides, and selenides. Such materials include oxides of cobalt, manganese, molybdenum, and vanadium; sulfides of titanium, molybdenum, and niobium; the various chromium oxides; copper oxides; and lithiated oxides of cobalt, manganese and nickel; and the like. Cathodic materials include $Li_xMn_2O_4$, $LiCoO_2$, $LiNiO_2$, $LiCo_{0.5}Ni_{0.5}O_2$, and the like. In a preferred embodiment, the cathodic material is mixed with an electroconductive material such as graphite, powdered carbon, powdered nickel, metal particles, conductive polymers, and the like.

Cathodes suitable for use in the subject invention include a polymeric binder. That is, a solid polymeric matrix provides part of the structure of the cathode. As with the separator, the binder is formed using a polymeric binder which is homogenized.

The cathode is preferably produced using a polymeric binder to fore the positive cathodic film, i.e., a solid polymeric matrix provides part of the structure of the cathode. As with the separator, the polymeric binder is formed using both a solid-polymer-forming material and a plasticizer compound. Polymeric binder materials also find use as the polymeric electrolyte film.

The cathodic electrode of the subject invention usually comprises a cathode film laminated onto one or both sides of the cathodic current collector. Typically, the cathode film is from about 100 μm to about 200 μm thick. Preferably, each cathode film is about 130 μm to about 175 μm.

The cathode commonly includes a current collector laminated with the cathode electrode material. The cathode sheet can be laminated on one or both sides of the current collector and heat-processed in place to provide an integral cathode structure. An adhesion promoter can be used to facilitate bonding between the cathode film and the cathode current collector.

Preferably an aluminum foil sheet, open mesh, expanded metal, woven or non-woven or knitted wire fabric or grid is used. Materials suitable for cathodic current collectors are known to the art, and are typically comprised of an electron conductive material such as metals or alloys. The cathode current collector is typically of aluminum, stainless steel, and such foils having a protective conductive coating foil. Preferably, the current collector has a thickness from about 20 μm to about 100 μm, more preferably about 40 μm to about 50 μm. Each current collector is also connected to a current collector tab which extends from the edge of the current collector. In batteries comprising multiple electrochemical cells, the cathode tabs are preferably welded together and connected to a lead. External loads can be electrically connected to the leads. Current collectors and tabs are described in U.S. Pat. Nos. 4,925,752; 5,011,501; and 5,326,653, each of which is incorporated herein.

An electrolytic cell precursor is prepared by assembling an anode, a separator, and a cathode, and extracting plasticizer from each of the layers. Although each of the electrodes and the separator can be individually extracted, it is generally more convenient to laminate or assemble the appropriate layers with the plasticizer intact, and extract the plasticizer from the battery precursor as a unit. Methods for battery precursor preparation and extraction are described in U.S. Pat. No. 5,456,000, which is incorporated herein by reference.

It is desirable that film layers deform as little as possible upon extraction. However, some shrinkage of the film layers will take place. A film exhibits acceptable film shrinkage characteristics if the shrinkage, measured as a function of film area, is equal to or less than 15%. Good film shrinkage characteristics are demonstrated by films which shrink 12% or less upon extraction. Films which shrink by 10% or less in area upon extraction show excellent shrinkage characteristics.

The conductivity of the separator is measured after extraction of the plasticizer and activation with the electrolyte solution. Films having conductivity greater than $1.0 \times 10^{-3}$ S/cm at room temperature are generally acceptable. Films having conductivity greater than $2.0 \times 10^{-3}$ S/cm are preferred. Films exhibiting conductivities equal to or greater than $2.2 \times 10^{-3}$ S/cm demonstrate more preferred conductivity characteristics.

The extracted battery precursor is activated by the addition of a solvent/electrolytic salt solution.

The electrolyte solvent is a solvent included in the electrolyte solution for the purpose of solubilizing alkali salts during operation of the electrolytic cell. The electrolyte solvent can be any compatible, relatively non-volatile, aprotic, relatively polar solvent. Preferably these materials have boiling points greater than about 85° C. to simplify manufacture and increase the operation range and shelf life of the battery. Typical examples of solvents are dimethyl carbonate (DMC), diethyl carbonate (DEC), propylene carbonate (PC), ethylene carbonate (EC), methyl ethyl carbonate (MEC), gamma-butyrolactone, triglyme, tetraglyme, dimethylsulfoxide, dioxolane, sulfolane, and the like, and mixtures of such materials.

An electrolyte system comprising ethylene carbonate (EC) and dimethyl carbonate (DMC) is a preferred solvent system. When an EC/DMC binary electrolyte solvent system is used, the electrolyte preferably includes at least 40 wt % EC. Generally, the plasticizer includes from about 40 to about 90 wt % EC and from about 60 to about 10 wt % DMC. More preferably, the plasticizer includes from about 50 to about 80 wt % EC and from about 50 to about 20 wt % DMC. An especially preferred binary electrolyte solvent is two-thirds ethylene carbonate and one-third dimethyl carbonate, by weight.

Electrolyte salts are those inorganic salts which are suitable for use in a non-aqueous electrolyte. Particularly useful are alkali salts wherein the cation of the salt is an alkali selected from the group consisting of lithium, sodium, potassium, rubidium, silver, and cesium, and which are suitable for use in the solvent-containing electrolyte and in the composite electrodes of an electrolyte cell.

A variety of electrolyte salts are known to the art. For example, $LiPF_6$, $LiSCN$, $LiAsF_6$, $LiClO_4$, $LiN(CF_3SO_2)_2$, $LiBF_4$, $LiCF_3SO_3$, $LiSbF_6$, $NaSCN$, and the like. The electrolyte salt typically comprises from about 5 to about 25 weight percent of the inorganic ion salt based on the total weight of the electrolyte. Preferably, the salt is from about 10 to 20 weight percent. The weight percent of the salt depends on the type of salt and upon the specific electrolyte solvent employed. A preferred electrolyte salt is a lithium salt, $LiPF_6$, in a final concentration of approximately 8 to 15 wt % based upon the total weight of the binary electrolyte.

Because many electrolyte salts are sensitive to moisture or other chemical compounds, the activation of the electrolytic cell precursor preferably takes place in an inert, moisture-free atmosphere, such as under an argon atmosphere. Electrolytic cells and cell precursors are preferably packaged for storage in moisture-impermeable packaging.

The following examples are offered for purposes of demonstration, and not by way of limitation.

EXAMPLE 1

Cathode Current Collector

The cathode current collector employed is an etched aluminum grid, having a layer of adhesion promoter on the surface of the grid.

An aluminum grid used for the anode current collector is a sheet of expanded aluminum metal about 50 μm thick. It is available under the designation 2A105-077 (flattened and annealed) (Delker, Branford, Conn.).

The surface of the aluminum grid is prepared by etching the grid in a series of solutions. Specifically, the aluminum grid is placed into an acetone bath for 5 minutes. It is then rinsed in water for 1 to 2 minutes. The aluminum grid is then dipped in an etch bath solution comprising 28 grams of potassium hydroxide pellets which have been dissolved in 500 mL of methanol. The aluminum grid is removed from the etch solution after 8 minutes, and placed in a fresh water bath for 8 minutes, followed by an acetone bath for 3 minutes.

An adhesion promoter layer is prepared as a dispersed colloidal solution. A grid coating is formed by adding 100 parts (by weight) ethanol, 100 parts Morton Adcote 50C12, and 5 parts Super P™ into a ball mix jar, and mixed for one hour. The dispersed colloidal solution is diluted in 100 parts ethanol and spray coated onto the etched aluminum grid.

EXAMPLE 2

Cathode Structure

A cathode is prepared by first preparing a polymer/cathode active materials mixture. After suitable mixing, a plasticizer is added to the homogenous dry mix. The plasticized material is hot pressed into two sheets. Each sheet is placed on one face of a cathode current collector. Pressure is applied to provide a good physical bond between the cathode material and the current collector. The cathode material is heated to form a strong, durable cathode structure.

A polymer/cathode mixture is prepared by mixing 1.0 grams of KYNAR™ 741 (a homopolymer of polyvinylidene difluoride (PVdF), Elf Atochem, Philadelphia, Pa.), 6.5 grams of LMO (Kerr McGee, a blend of $Li_xMn_2O_4$ (spinel, $0 \leq x \leq 2$)), and 0.5 grams of SUPER-P™ carbon black (M. M. M. Carbon, Willebrock, Belgium). The material is mixed for 24 hours in a ball milling jar.

To the dry, powdery cathode active mix is added 2.0 grams of dimethyl adipate (DMA) (Aldrich, Milwaukee, Wis.). The wetted material is mixed under high shear for ten to thirty minutes, until a homogeneous mixture is formed. A Brabedber mixer maintained at a temperature of 130° C. is appropriate for the mixing.

Two cathode sheets, each having a thickness of 125 μm, are formed by hot pressing at 130° C. for 30 seconds on an appropriate substrate. A current collector of Example 1 is placed on the upper surface of the first cathode sheet. A second cathode sheet is then placed on the upper surface of the current collector. Pressure is applied to the resultant three-layer structure, to provide good contact between the layers, and the structure is hot-pressed at 130° C. for 30 seconds to form a cathode structure. The final total thickness, including the cathode film and the aluminum grid, is approximately 225 μm.

EXAMPLE 3

Anode Current Collector

The anode current collector employed is an etched copper grid, having a layer of adhesion promoter on the surface of the grid.

A copper grid used for the anode current collector is a sheet of expanded copper metal about 50μm thick. It is available under the designation 2Cu5-155 (flattened and annealed) (Delker, Branford, Conn.).

The surface of the copper grid is prepared by etching the grid in a series of solutions. Specifically, the copper grid is placed into an acetone bath for 5 minutes. It is then rinsed in water for 1 to 2 minutes. The copper grid is then dipped in an etch bath solution comprising 1 molar nitric acid (35 ml 70% nitric acid and 500 mL of water). The copper grid is removed from the etch solution after 5 minutes, and placed in a fresh water bath for 8 minutes, followed by an acetone bath for 3 minutes.

An adhesion promoter layer is prepared as described above, and spray coated onto the etched copper grid.

EXAMPLE 4

Anode Structure

An anode is prepared by first preparing a polymer/anode active materials mixture. After suitable mixing, a plasticizer is added to the uniform, dry mix. The plasticized material is hot pressed to form two sheets. Each sheet is placed on one face of an anode current collector. Pressure is applied to provide a good physical bond between the anode material and the current collector. The anode material is heated to form a strong, durable cathode structure A polymer mixture is prepared by placing 1.2 grams of PVdF homopolymer (KYNAR™ 741) with 5.8 grams of SFG-15™ graphite (Lonza G & T, Ltd., Sins, Switzerland) into a ball mill jar and mixing for 24 hours. This produces a dry, powdery mix in which the particles are well-mixed and of small size.

To the dry, powdery mix is added 3.0 grams of dimethyl adipate (DMA). The wetted material is mixed under elevated temperature (130° C.) and high shear conditions for ten to thirty minutes or more, until a homogeneous mixture is formed.

The anode sheets are formed by hot pressing at 130° C. for 30 seconds on an appropriate substrate. A current collector of Example 3 is placed on the upper surface of the first anode sheet. A second anode sheet is then placed on the upper surface of the current collector. Pressure is applied to the resultant three-layer structure, to provide good contact between the layers, and it is laminated at 120° C. with a hot roll laminator or hot press to form an anode structure. The final total thickness, including the anode film and the copper grid, is approximately 250 μm.

EXAMPLE 5

Separator

A polymeric electrolyte film is formed by ball-mixing a homopolymeric binder with a filler material. After suitable mixing, a plasticizer is added to the uniform, dry mix. The plasticized material is formed into a sheet and heated to form a strong, durable electrolytic separator.

2.0 grams of treated fumed silica and 3.0 grams of PVdF homopolymer (KYNAR™ 741) are placed into a ball mill jar and mixed for 24 hours. This produces a dry, powdery mix in which the particles are well-mixed.

To the dry, powdery mix is added 5.5 grams of dimethyl adipate (DMA). The wetted material is minced under low shear for five to ten minutes, until a homogeneous mixture is formed.

The resultant mixture is hot-pressed at 130° C. for 30 seconds to form a strong, clear film having a thickness of 2 mil. The conductivity is tested and found to be $2.3 \times 10^{-3}$ S/cm. The shrinkage is measured to be 12%.

EXAMPLE 6

Preparation of Electrolytic Cell Precursor

The constituent elements of a battery precursor are positioned and laminated.

A solid electrochemical cell precursor is formed by first positioning a polymeric electrolyte film of Example 5 between a cathode of Example 2 and an anode of Example 4, and then fusing the structures under moderate pressure (40 psi) and a temperature of 120° C.

EXAMPLE 7

Extraction Process

The plasticizer is extracted from the precursor. Extraction can be accomplished using conventional organic liquid solvents such as methanol or ether.

The solid electrochemical precursor cell of Example 6 is immersed in a bath of methanol or diethyl ether or in a series of methanol or ether baths, to remove the plasticizer. Preferably, the methanol or ether bath(s) provide at least 30 minutes of contact with an excess of methanol or ether.

The extracted cell precursor is vacuum dried overnight at 40° C., and stored under dry box or anhydrous conditions until the cell is activated using an electrolyte solution.

EXAMPLE 8

Activation of Electrolytic Cell Precursor

An extracted electrochemical cell precursor is prepared according to Example 7. An electrolyte solvent is prepared by combining 26.7 grams of ethylene carbonate and 13.3 grams of dimethyl carbonate. To the electrolyte solvent is added 6.0 grams of $LiPF_6$ to form an electrolyte solvent solution. The electrolyte solvent solution is added to the cell precursor of Example 7. The activated electrolytic cell is packaged under vacuum in a rigid casing.

EXAMPLE 9

Experimental

A series of electrolyte separators are prepared according to the method Example 9, as shown in Table 1.

the copolymeric binder, the film still demonstrates an unacceptable shrinkage.

The addition of EXPANCEL™ DU does not have an appreciable effect on the shrinkage rate of the film, but it can serve to make the film softer and more flexible.

Use of varying combinations of homopolymeric PVdF, silica, and ball mill time in the subject method provides a variety of films having acceptable ($\leq 20\%$) to good ($\leq 12\%$) and excellent ($\leq 10\%$) shrinkage, based upon area of the film before and after extraction of the plasticizer using diethyl ether.

Varying combinations of homopolymeric PVdF, silica, and ball mill time in the subject method provides a variety of films having acceptable ($>1.0\times 10^{-8}$ S/cm) to good ($>1.5\times 10^{-3}$ S/cm) or excellent ($\geq 2.2\times 10^{-3}$ S/cm) conductivities in the presence of electrolyte solution (e.g., $LiPF_6$ in EC/DMC 2:1), as reflected in Table 1.

TABLE 1

| | Silica (g) | | PVdF (g) | | | Expancel (g) | SiO2:Binder (ratio) | Ball Mill (hr) | Plasticizer (g) | | Film Characteristics | Shrinkage (%) | Conductivity S/cm |
|---|---|---|---|---|---|---|---|---|---|---|---|---|---|
| | ST-610 | ST-530 | 2801 | 741 | 461 | | | | DMA | DBP | | | |
| 151-91 | | | 2.85 | | | 0.15 | | — | 2.50 | | opaque | 40.0 | |
| 162-01A | 1.65 | | 3.30 | | | 0.55 | 2:3 | — | 6.80 | | opaque | — | |
| 162-01B | 1.95 | | 3.90 | | | 0.65 | 2:3 | 2 | | 8.70 | cracked | 22.0 | |
| 162-04 | 3.32 | | 4.15 | | | 0.83 | 4:5 | 2 | 8.30 | | opaque | 19.0 | |
| 162-105A | 2.84 | | 4.26 | | | | 2:3 | 16 | 8.80 | | clear | 22.0 | |
| 162-105B | 1.20 | | 1.80 | | | | 2:3 | 16 | 3.30 | | clear | 21.5 | |
| 162-08 | | 1.86 | 2.24 | | | | 5:6 | 4 | 6.70 | | clear | 29.0 | |
| 162-09 | | 1.64 | 1.64 | | | 0.32 | 1:1 | 3 | 6.00 | | opaque | 26.0 | |
| 162-10 | 1.51 | | 1.85 | | | 0.12 | 5:6 | 3 | 6.20 | | opaque | 27.0 | |
| 162-11 | 1.34 | | | 1.67 | | 0.34 | 4:5 | 2 | 4.90 | | opaque | 20.0 | |
| 162-21 | 2.00 | | | 2.50 | | 0.50 | 4:5 | 16 | 5.00 | | opaque | 12.0 | $2.2 \times 10^{-3}$ |
| 162-22 | 2.00 | | | | 2.50 | 0.50 | 4:5 | 16 | 5.00 | | opaque | 12.0 | |
| 162-27 | | 2.00 | | 2.50 | | 0.50 | 4:5 | 24 | 5.00 | | opaque | 12.0 | $1.5 \times 10^{-3}$ |
| 162-28 | | 2.00 | | | 2.50 | 0.50 | 4:5 | 24 | 6.50 | | opaque | 19.0 | |
| 162-29 | 2.00 | | | 3.00 | | | 2:3 | 24 | 5.50 | | opaque | 12.0 | $2.3 \times 10^{-3}$ |
| 162-30 | 2.00 | | | | 3.00 | | 2:3 | 24 | 5.50 | | clear | 19.0 | $2.2 \times 10^{-3}$ |
| 162-37 | | 1.60 | | 2.40 | | | 2:3 | 3 | 6.18 | | clear | 15.0 | $1.2 \times 10^{-3}$ |
| 162-37 | | 1.60 | | 2.40 | | | 2:3 | 8 | 5.50 | | clear | 12.0 | |
| 162-37 | | 1.60 | | 2.40 | | | 2:3 | 24 | 4.10 | | clear | 10.0 | $1.3 \times 10^{-3}$ |
| 162-37 | | 1.60 | | 2.40 | | | 2:3 | 24 | 5.20 | | clear | 12.0 | |
| 162-38 | 1.60 | | | 2.40 | | | 2:3 | 3 | 5.50 | | clear | 15.0 | |
| 162-38 | 1.60 | | | 2.40 | | | 2:3 | 8 | 4.80 | | clear | 12.0 | $1.6 \times 10^{-3}$ |
| 162-38 | 1.60 | | | 2.40 | | | 2:3 | 24 | 4.00 | | clear | 10.0 | $1.5 \times 10^{-3}$ |
| 162-38 | 1.60 | | | 2.40 | | | 2:3 | 24 | 5.20 | | clear | 15.0 | |

Use of the copolymeric KYNAR™ 2801 PVdF/HFP binder without ball milling and without a silica provides an unacceptable shrinkage with DMA plasticizer (greater than 20%). The DBP plasticizer and the PVdF/HFP copolymer of the prior art yield a film which is unacceptable due to cracking. When ball mill processing (16 hours) is applied to As can be seen from Table 2, the molecular weight and molecular weight distribution of binder can make a difference. The KYNAR™ 741 tends to provide a more advantageous shrinkage rate than the KYNAR™ 461, although at moderate ball mixing times, the two binder grades appear to provide similar results.

TABLE 2

| | Silica (g) | | PVdF (g) | | Expancel | SiO2:Binder | Ball Mill | DMA | Shrink-age |
|---|---|---|---|---|---|---|---|---|---|
| | ST-610 | ST-530 | 741 | 461 | (g) | (ratio) | (hr) | (g) | (%) |
| 162-21 | 2.00 | | 2.50 | | 0.50 | 4:5 | 16 | 5.00 | 12.0 |
| 162-22 | 2.00 | | | 2.50 | 0.50 | 4:5 | 16 | 5.00 | 12.0 |
| 162-27 | | 2.00 | 2.50 | | 0.50 | 4:5 | 24 | 5.00 | 12.0 |
| 162-28 | | 2.00 | | 2.50 | 0.50 | 4:5 | 24 | 6.50 | 19.0 |
| 162-29 | 2.00 | | 3.00 | | | 2:3 | 24 | 5.50 | 12.0 |
| 162-30 | 2.00 | | | 3.00 | | 2:3 | 24 | 5.50 | 19.0 |

Table 3 shows the effects of increased homogenization (ball mixing) upon the shrinkage rate of a similar mixture. The amount of plasticizer (DMA) necessary to produce a uniform, workable mixture varies with the amount of homogenization.

All percentages are weight/weight percent, unless noted otherwise. When a range of values is given to be "about" a certain percentage, each of the upper and lower ranges can be varied by 5 to 10 percent if such variation does not cause detrimental function to the system.

TABLE 3

| | Silica (g) | | PVdF (g) | Expan-cel | SiO2:Binder | Ball Mill | DMA | Shrink-age | Con-ductivity |
|---|---|---|---|---|---|---|---|---|---|
| | ST-610 | ST-530 | 741 | (g) | (ratio) | (hr) | (g) | (%) | S/cm |
| 162-11 | 1.34 | | 1.67 | 0.34 | 4:5 | 2 | 4.90 | 20.0 | |
| 162-21 | 2.00 | | 2.50 | 0.50 | 4:5 | 16 | 5.00 | 12.0 | $2.2 \times 10^{-3}$ |
| 162-37 | | 1.60 | 2.40 | | 2:3 | 3 | 6.18 | 15.0 | $1.2 \times 10^{-3}$ |
| 162-37 | | 1.60 | 2.40 | | 2:3 | 8 | 5.50 | 12.0 | |
| 162-37 | | 1.60 | 2.40 | | 2:3 | 24 | 4.10 | 10.0 | $1.3 \times 10^{-3}$ |
| 162-37 | | 1.60 | 2.40 | | 2:3 | 24 | 5.20 | 12.0 | |
| 162-38 | 1.60 | | 2.40 | | 2:3 | 3 | 5.50 | 15.0 | |
| 162-38 | 1.60 | | 2.40 | | 2:3 | 8 | 4.80 | 12.0 | $1.6 \times 10^{-3}$ |
| 162-38 | 1.60 | | 2.40 | | 2:3 | 24 | 4.00 | 10.0 | $1.5 \times 10^{-3}$ |
| 162-38 | 1.60 | | 2.40 | | 2:3 | 24 | 5.20 | 15.0 | |

Table 4 demonstrates the effect of varying the homogenization time on a single, consistent formulation. Increased homogenization provides enhanced film characteristics.

TABLE 4

| | ST-610 (g) | PVdF (g) | Ball Mill (hr) | DMA (g) | Shrinkage (%) |
|---|---|---|---|---|---|
| A | 1.60 | 2.40 | 0 | 4.80 | cracked film |
| B | 1.60 | 2.40 | 3 | 4.80 | cracked film |
| C | 1.60 | 2.40 | 8 | 4.80 | 12.0 |
| D | 1.60 | 2.40 | 24 | 4.80 | 14.0 |

Table 5 demonstrates the effect of increased plasticizer amount when the homogenization is maintained at 24 hours of ball milling with an otherwise consistent formulation. While it is necessary to provide sufficient plasticizer to yield a viable film, enhanced film characteristics are provided when minimal plasticizer is used.

TABLE 5

| | ST-610 (g) | PVdF (g) | Ball Mill (hr) | DMA (g) | Shrinkage (%) |
|---|---|---|---|---|---|
| E | 1.60 | 2.40 | 24 | <4.00 | cracked film |
| F | 1.60 | 2.40 | 24 | 4.00 | 10.0 |
| G | 1.60 | 2.40 | 24 | 4.40 | 12.0 |
| H | 1.60 | 2.40 | 24 | 4.80 | 14.0 |
| I | 1.60 | 2.40 | 24 | 5.20 | 15.0 |

While the invention has been described in connection with several exemplary embodiments, it will be understood that many modifications will be apparent to those of ordinary skill in the art in light of the above disclosure. Reference to the following claims should be made to determine the scope of the claimed invention.

We claim:

1. A method for preparing an electrolytic cell element, said method comprising the steps of:

(a) homogenizing a homopolymeric polyvinylidene difluoride binder material and a filler material to form a uniform mix free of solvent;

(b) adding a plasticizer to the uniform mix of step (a) to form a plasticized material;

(c) forming the plasticized material into a sheet; and (d) heating the sheet to a temperature above the softening point and below the melting point of the plasticized material.

2. The method of claim 1 wherein said plasticizer is dimethyl adipate.

3. The method of claim 1 wherein said filler material is selected from the group consisting of fumed silica, fumed alumina, and mixtures thereof.

4. The method of claim 1 wherein said heating step (d) is conducted by heating to a temperature of at least about 110° C. and less than about 150° C.

5. The method of claim 1 wherein said homogenizing further comprises ball mixing for at least about three hours.

6. The method of claim 1 wherein said homogenizing further comprises ball mixing for at least 24 hours.

7. A method of claim 1 wherein said electrolytic cell element is a separator.

8. A method of claim 1 wherein said electrolytic cell element is a cathode film, and wherein said homogenizing step further comprises homogenizing a homopolymeric binder material and a cathode active material, to form a uniform mix free of solvent.

9. A method of claim 1 wherein said electrolytic cell element is an anode film, and wherein said homogenizing step further comprises homogenizing a homopolymeric binder material and an anode active material, to form a uniform mix free of solvent.

10. A method for preparing an electrolytic cell electrode material, said method comprising the steps of:
   (a) mixing a polyvinylidene fluoride and an electrode active agent, to form a homogeneous mix free of solvent;
   (b) adding a plasticizer to the homogeneous mix to form a plasticized material;
   (c) forming the plasticized material into a sheet; and
   (d) heating the sheet to a temperature above the softening point and below the melting point of the plasticized material to form a film.

11. The method of claim 10 wherein said plasticizer is dimethyl adipate.

12. The method of claim 10 wherein said heating step (e) is conducted by heating to a temperature of at least about 110° C. and less than about 150° C.

13. The method of claim 10 wherein said mixing step comprises ball mixing for at least about three hours.

14. The method of claim 10 wherein said mixing step comprises ball mixing for at least 24 hours.

15. A method of claim 10 wherein said electrolytic cell electrode material is a cathode film, and wherein said mixing step further comprises mixing polyvinylidene difluoride and cathode active material to form a homogeneous mix free of solvent.

16. A method of claim 10 wherein said electrolytic cell electrode material is an anode film, and wherein said mixing step further comprises mixing polyvinylidene difluoride and anode active material to form a homogeneous mix free of solvent.

* * * * *